(12) United States Patent
Nhiayi

(10) Patent No.: US 8,738,080 B2
(45) Date of Patent: May 27, 2014

(54) DOCKING STATION FOR ANDROID CELLPHONE

(75) Inventor: Ly Kao Nhiayi, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/428,690

(22) Filed: Mar. 23, 2012

(65) Prior Publication Data

US 2013/0252669 A1    Sep. 26, 2013

(51) Int. Cl.
*H04B 1/38* (2006.01)

(52) U.S. Cl.
USPC ............ 455/557; 455/556.1; 455/556.2; 455/572; 455/573; 455/566; 455/3.06; 455/41.2; 348/42; 348/47; 348/48; 348/308; 345/173; 345/419

(58) Field of Classification Search
USPC ............ 455/3.06, 556.1, 556.2, 557, 455/343.1–343.6, 41.2, 566, 571, 572, 573; 348/42, 47, 48, 308; 345/173, 419
See application file for complete search history.

(56) References Cited

U.S. PATENT DOCUMENTS

| | | | | |
|---|---|---|---|---|
| 6,151,646 | A * | 11/2000 | Watts et al. | 710/72 |
| 6,549,968 | B1 * | 4/2003 | Hart | 710/303 |
| 6,657,654 | B2 * | 12/2003 | Narayanaswami | 348/14.04 |
| 7,209,729 | B2 * | 4/2007 | Oyagi et al. | 455/404.1 |
| 7,656,439 | B1 | 2/2010 | Manico et al. | |
| 2002/0119800 | A1 * | 8/2002 | Jaggers et al. | 455/550 |
| 2004/0088452 | A1 * | 5/2004 | Scott | 710/62 |
| 2004/0132481 | A1 * | 7/2004 | Sugaya | 455/550.1 |
| 2007/0147827 | A1 * | 6/2007 | Sheynman et al. | 396/325 |
| 2008/0313686 | A1 | 12/2008 | Matvey | |
| 2010/0149432 | A1 * | 6/2010 | Roberts et al. | 348/734 |
| 2010/0253768 | A1 * | 10/2010 | El-Maraghi et al. | 348/51 |
| 2011/0136541 | A1 * | 6/2011 | Chang et al. | 455/558 |
| 2011/0248665 | A1 | 10/2011 | Smith et al. | |
| 2012/0190406 | A1 * | 7/2012 | Chen | 455/557 |

FOREIGN PATENT DOCUMENTS

GB        2394850 A  *  5/2004

OTHER PUBLICATIONS

Hands-on with OWLE's Bubo mount for the iPhone 4, by Heather Kelly, Macworld.com Feb. 4, 2011, http://www.macworld.com/article/157656/2011/02/owle_iphone.html.
Building Robots Just Got Easier, by Phillip Torrone, May 1, 2006, http://www.popsci.com/diy/article/2006-05/building-robots-just-got-easier.
Apple iCam: A Modular Concept Camera That Uses an iPhone for Brains, by Michael Zhang, Nov. 28, 2011, http://www.petapixel.com/2011/11/28/apple-icam-a-modular-concept-camera-that-uses-an-iphone-for-brains.

* cited by examiner

*Primary Examiner* — Olumide T Ajibade Akonai
(74) *Attorney, Agent, or Firm* — Fitch, Even, Tabin & Flannery LLP

(57) ABSTRACT

A system, method, and computer program product for a smartphone docking station in digital camera and camcorder form factors. The docking station provides an attached smartphone a better lens, image sensor, and image stabilization system for capturing pictures and videos, as well as a more familiar and steady user gripping and aiming platform for such photography. Imagery and audio from the smartphone and docking station may be combined into three-dimensional stereo media. The docking station also provides additional battery, data processing, and buffer capacities for the smartphone, as well as an external connector for accessories such as lights and microphones. The smartphone may provide GPS and other data, and network connectivity that allows data that it and/or the docking station captures to be easily transferred to/from to the internet. The smartphone may be used as a display, and may be based on the Android™ operating system or other operating systems.

16 Claims, 2 Drawing Sheets

DOCKING STATION FOR ANDROID CELLPHONE

FIELD OF THE INVENTION

This patent application relates in general to docking stations for cellphones that allow the combined devices to share functionality and act as a single augmented device, more specifically including smartphones providing display and communication functionality for attachable digital cameras/camcorders while using their computational and battery capacities.

BACKGROUND OF THE INVENTION

Cellphones, camcorders, and digital cameras are all popular consumer electronic devices. A cellphone is a device that can make and receive telephone calls over a radio link from within a wide geographic area by connecting to a cellular network provided by a mobile phone operator, allowing access to the public telephone network. A camcorder is a portable electronic device that combines a video camera and a video recorder into one unit, typically for hand-held consumer use. Digital cameras are generally smaller than camcorders, and while once limited to capturing still images are increasingly capable of recording video as well.

Cellphones have increased in capability and have now evolved into so-called smartphones. These mobile phones are built on a mobile computing platform, with more advanced computing ability and connectivity than a typical cellular phone. The first smartphones were devices that mainly combined the functions of a personal digital assistant (PDA) and a mobile phone or camera. Modern models also incorporate the functions of portable media players, low-end compact digital cameras, pocket video cameras, and GPS navigation units.

Today's smartphones typically also include high-resolution touchscreens, web browsers that can access and properly display standard web pages, and high-speed data access via Wi-Fi and mobile broadband links. Application programming interfaces (APIs) on smartphones allow third-party applications to better integrate with the phone's operating system and hardware, while cellphones more commonly run on proprietary firmware. A variety of operating systems power conventional smartphones, including Android™, iOS™, and Windows® Phone (Android™ is a trademark of Google Inc., iOS™ is a trademark of Cisco Systems used under license by Apple Inc., and Windows® is a trademark of Microsoft Corporation).

The confluence of consumer electronic devices and capabilities continues, yet each device type retains particular advantages for its intended design. Each also has limitations that prevent adoption as a true general-purpose consumer device widely carried for everyday use. For example, sharing of captured videos via the internet is a popular activity, yet many smartphone users do not find their captured video imagery to be as high quality as that captured by a camcorder and later (and less conveniently) shared online via a personal computer.

This patent application provides a viable approach to solving this challenge and presents a practical implementation of that technique.

SUMMARY OF THE EMBODIMENTS

A system, method, and computer program product for a smartphone docking station are disclosed and claimed herein.

A system embodiment may comprise a docking station comprising a main body, a battery, a lens, and an imaging sensor, and a connector that mechanically and electrically connects the main body with a smartphone. The main body may have a camcorder form factor or a camera form factor. The battery may provide electrical power to the smartphone. Image data may be shared between the docking station and the smartphone. The docking station may further comprise a memory, a microphone, an accessory attachment, a tripod mount, and a viewport for smartphone sensors. The smartphone may include a display. The docking station may further comprise an operating memory and a processor that executes an operating system including at least one of Android™, iOS™, and Windows® Phone. The docking station may combine at least one of image data and audio data captured by the docking station and the smartphone into stereo media.

A computer program product embodiment for operating a smartphone docking station may comprise a non-transitory computer readable medium tangibly embodying non-transitory computer-executable program instructions thereon that, when executed, cause a computing device to control sharing of electrical power between a smartphone and a smartphone docking station, and control sharing of data between the smartphone and the docking station.

An exemplary computer-implemented method embodiment for operating a smartphone docking station may comprise detecting the connection of a smartphone to a docking station comprising a main body, a battery, a lens, and an imaging sensor, and responsively sharing electrical power and data between the docking station and the smartphone. The main body may have a camcorder form factor or a camera form factor. The battery may provide electrical power to the smartphone. Image data may be shared between the docking station and the smartphone. The docking station may further comprise at least one of a memory, a microphone, an accessory attachment, a tripod mount, and a viewport for smartphone sensors. The smartphone may include a display. The docking station may further comprise an operating memory and a processor that executes an operating system including at least one of Android™, iOS™, and Windows® Phone. The method may further comprise combining at least one of image data and audio data captured by the docking station and the smartphone into stereo media.

As described more fully below, the apparatus and processes of the embodiments disclosed enable enhanced docking stations for smartphones. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

DETAILED DESCRIPTION OF EXEMPLARY EMBODIMENTS

Figure 1:
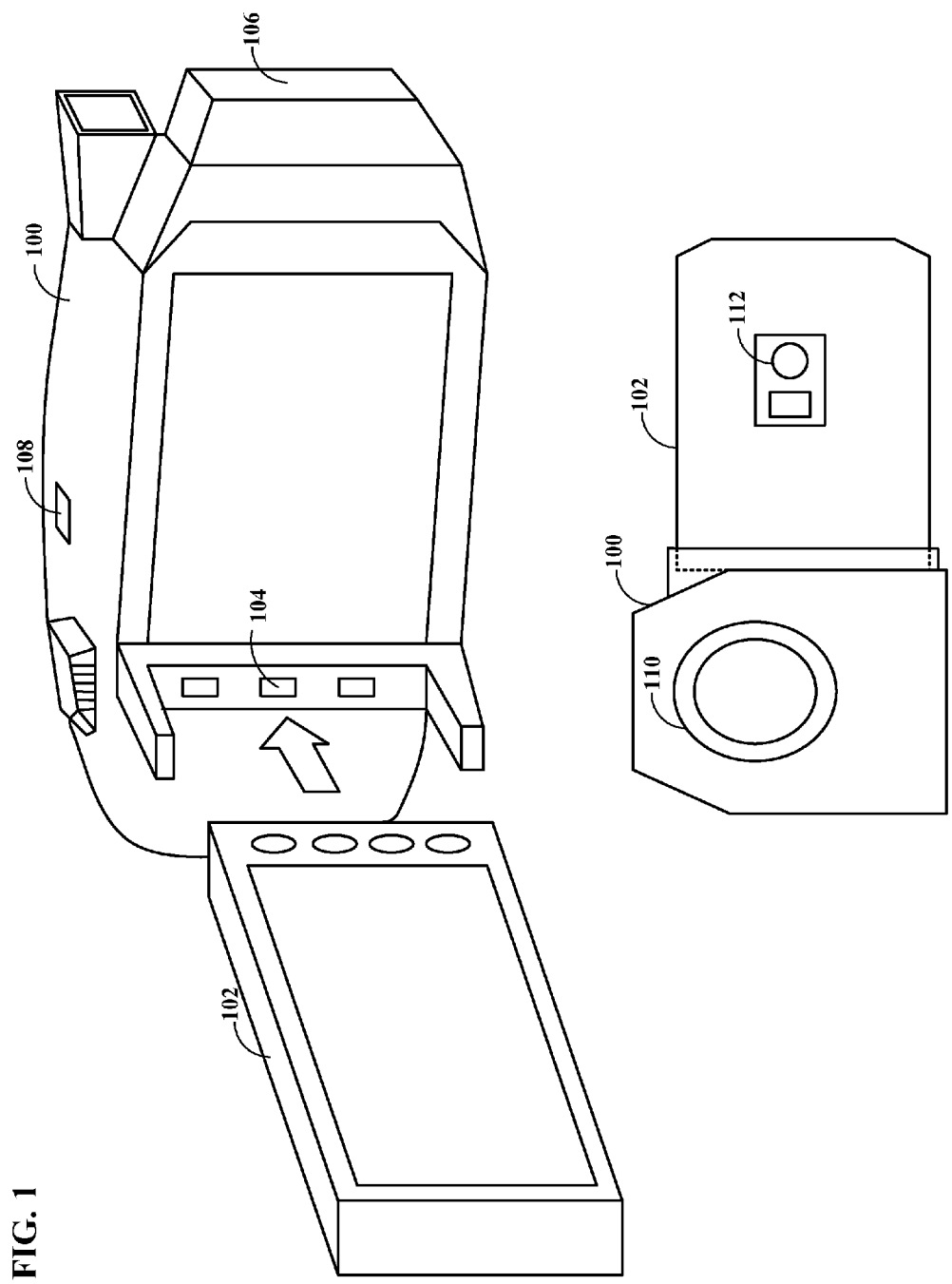
FIG. 1 depicts a smartphone docking station in a camcorder form factor, according to a first embodiment.

Referring now to FIG. 1, a smartphone docking station 100 in a camcorder form factor is shown. A side view and a front view of the embodiment are provided. Smartphones may not provide the most stable gripping areas for steady photography. However, users of consumer electronics devices are generally familiar with camcorder style devices, including their superior gripping, handling, and aiming characteristics. Thus, this form factor docking station embodiment should be readily accepted. Docking station 100 may indeed operate independently as a camcorder. Docking station 100 may include a tripod mount (not shown) for further stability.

Smartphones have limited computational capacity, e.g. cpu and operating memory. Digital cameras and camcorders may have better cpus and more memory available for performing internal operations, including image processing. Smartphone 102 therefore attaches to connector 104 mechanically and electrically as shown. Connector 104 also enables data transfer between smartphone 102 and docking station 100. Connector 104 may rotate so that smartphone 102 lies flat against docking station 100.

Smartphone 102 may serve as a viewfinder or playback display by depicting imagery from its own imaging sensor and/or the imaging sensor on the docking station while connected to the docking station.

Smartphones have limited battery capacity and memory storage capacity. Digital cameras and camcorders have their own, typically larger battery capacities, and may have larger memories, including externally attached memory devices, which are helpful when streaming video. Docking station battery 106 therefore provides electrical power to docking station 100, and may also provide electrical power to smartphone 102 when it is attached via connector 104, optionally even recharging the battery of smartphone 102. Hotshoe 108 on docking station 100 provides an accessory attachment point, for use with lights and microphones for example.

Smartphone lenses and imaging sensors are often of less than premium quality, which typically keeps them from being viewed as true alternatives to more advanced cameras. Digital cameras and camcorders generally have better lenses and imaging sensors, often including interchangeable and/or zoom and/or macro lenses. Docking station lens 110 may therefore be a high quality detachable and/or zoom and/or macro lens as is often used with a conventional camcorder.

Smartphones may not have image stabilization and auto-focusing systems, while digital cameras and camcorders typically do. Lens 110 may thus be part of an image stabilization system built into docking station 100. Smartphone lens 112 may focus light onto a smartphone imaging device (not shown) to produce images similar to the images captured via docking station lens 110, but these images are taken from an offset position when smartphone 102 is attached to docking station 100. Smartphone 102 may also include its own microphone (not shown). The docked smartphone may thus take stereo images and audio using the optical systems and microphones from both smartphone 102 and docking station 100.

Figure 2:
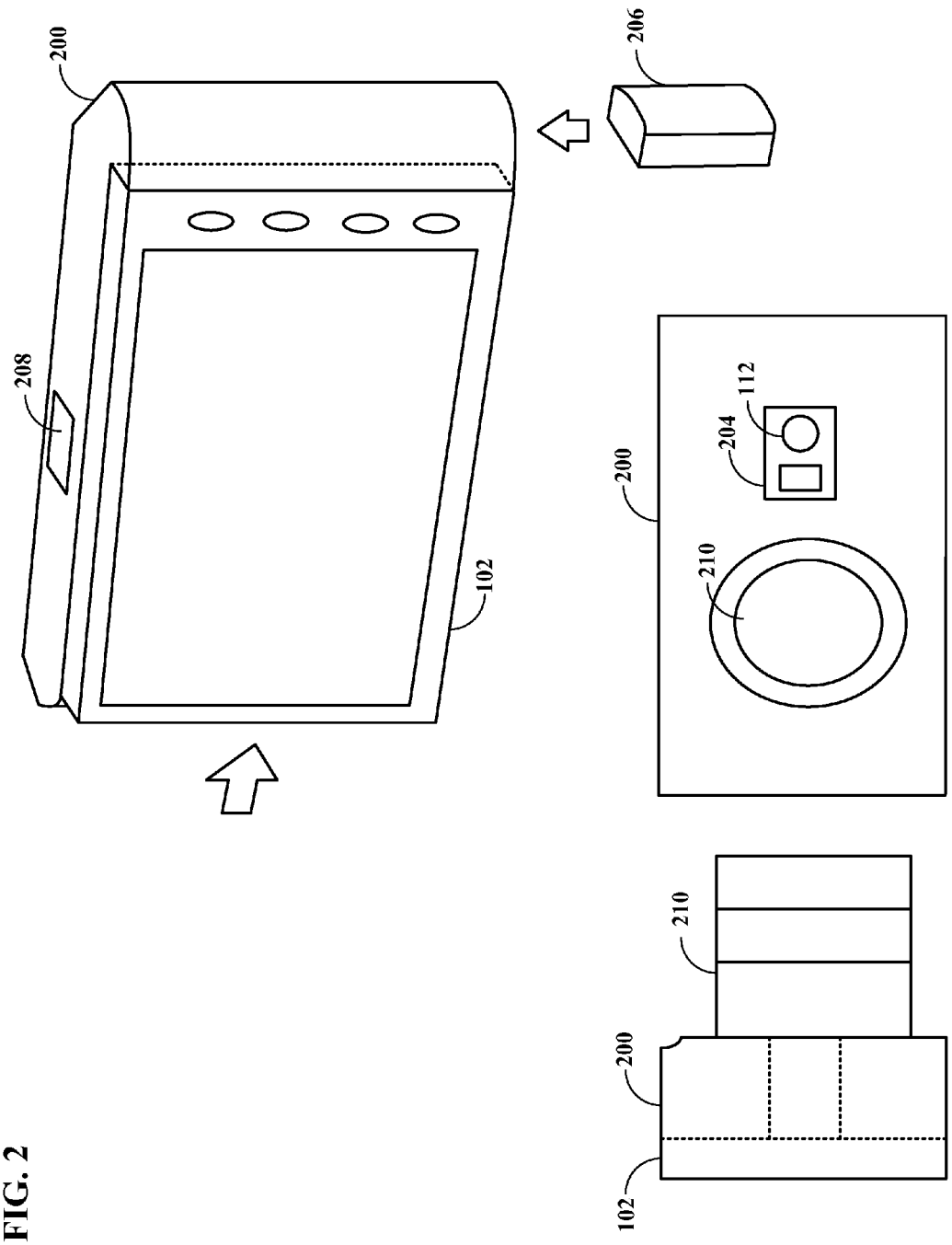
FIG. 2 depicts a smartphone docking station in a camera form factor, according to another embodiment.

Referring now to FIG. 2, a smartphone docking station 200 in a camera form factor is shown. A side view, rear view, and a front view of the embodiment are provided. This embodiment is designed to be gripped, handled, and aimed by a user in a similar manner to a familiar SLR-type camera, and indeed may operate independently as a camera. Docking station 200 may also include a tripod mount (not shown).

In this embodiment, as in the first embodiment, smartphone 102 attaches mechanically and electrically to docking station 200 as shown, but to a rear face. The attachment also enables smartphone 102 and docking station 200 to share data. Smartphone 102 may again serve as a display, both as a viewfinder during image capture and as a viewer for image review or video playback.

Docking station 200 includes auxiliary battery 206, which provides electrical power to the docking station, and may also provide electrical power to smartphone 102 when attached, optionally even recharging the battery of smartphone 102. Docking station 200 may also include a hotshoe 208 as in the previous embodiment, for attaching accessories such as lights and microphones (not shown).

Docking station lens 210 may be a high quality detachable and/or zoom and/or macro lens, as is often used with a conventional camera. Lens 210 may also be part of an image stabilization system built into docking station 200. Docking station 200 preferably includes a viewport 204 extending through its main body to provide a clear field of view for smartphone lens 112 and optionally clear access to a microphone of smartphone 102 (not shown). Smartphone lens 112 may present images to a smartphone imaging device (not shown) similar to the images captured via docking station lens 210, but these images are taken from an offset position when smartphone 102 is attached to docking station 200. The docked smartphone may thus take stereo images and audio using the optical systems and microphones from both smartphone 102 and docking station 200.

Smartphones routinely have network connectivity, making sharing images and video very easy for users. Digital cameras and camcorders may not have network connectivity and sharing capabilities. Docked smartphone 102 may thus enable data captured by a docking station to be more easily transmitted via the internet, e.g. for video sharing or chat applications.

A software application to coordinate smartphone and docking station operation may execute on either or both the smartphone and docking station platforms. Application instances may interact to share media and operating capacities (e.g. cpu, memory, battery, and image processing applications). Further, applications may combine images and/or audio captured simultaneously by separate lenses and microphones of the smartphone and docking station to produce three-dimensional media.

The operating system of the smartphone or docking station may include but is not limited to Android™, iOS™, and Windows® Phone, for example, or various heterogeneous combinations (i.e. each device may include a processor that runs its own operating system).

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the embodiments described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A smartphone docking station, comprising:
    a docking station comprising a main body, a battery, a lens, and an imaging sensor; and
    a connector that mechanically and electrically connects the main body with a smartphone;
    wherein when a smartphone is connected to the connector, a display screen of the smartphone functions as a viewfinder for playback display of imagery from the imaging sensor;
    wherein the docking station is configured to operate as a handheld camcorder without being connected to the smartphone;
    wherein the smartphone further comprises a smartphone camera; and
    wherein the imaging sensor of the docking station and the smartphone camera are configured to each capture an image from offset positions to form a stereo image.

2. The docking station of claim 1 wherein the docking station has one of a camcorder form factor and a camera form factor.

3. The docking station of claim 1 wherein the battery provides electrical power to the smartphone.

4. The docking station of claim 1 wherein image data is shared between the docking station and the smartphone.

5. The docking station of claim 1 further comprising at least one of a memory, a microphone, an accessory attachment, a tripod mount, and a viewport for smartphone sensors.

6. The docking station of claim 1 further comprising an operating memory and a processor that executes an operating system including at least one of Android, iOS, and Windows Phone.

7. The docking station of claim 1 that combines at least one of image data and audio data captured by the docking station and the smartphone into stereo media.

8. A computer program product for operating a smartphone docking station, comprising a non-transitory computer readable medium tangibly embodying non-transitory computer-executable program instructions thereon that, when executed, cause a computing device to:
    control sharing of electrical power between a smartphone and a smartphone docking station;
    control sharing of data between the smartphone and the docking station;
    wherein when the smartphone is connected to the docking station, a display screen of the smartphone functions as a viewfinder for playback display of imagery from the imaging sensor;
    wherein the smartphone further comprises a smartphone camera; and
    wherein the imaging sensor of the docking station and the smartphone camera are configured to each capture an image from offset positions to form a stereo image.

9. A computer-implemented method for operating a smartphone docking station, comprising:
    detecting connection of a smartphone to a docking station comprising a main body, a battery, a lens, and an imaging sensor; and
    responsively sharing electrical power and data between the docking station and the smartphone,
    wherein the shared data is adapted to cause a display screen of the smartphone to function as a viewfinder for playback display of an imagery from the imaging sensor;
    wherein the docking station is configured to operate as a handheld camcorder without being connected to the smartphone; and
    wherein the smartphone further comprises a smartphone camera; and
    wherein the imaging sensor of the docking station and the smartphone camera are configured to each capture an image from offset positions to form a stereo image.

10. The method of claim 9 wherein the docking station has one of a camcorder form factor and a camera form factor.

11. The method of claim 9 wherein the battery provides electrical power to the smartphone.

12. The method of claim 9 wherein image data is shared between the docking station and the smartphone.

13. The method of claim 9 wherein the docking station further comprises at least one of a memory, a microphone, an accessory attachment, a tripod mount, and a viewport for smartphone sensors.

14. The method of claim 9 wherein the docking station further comprises an operating memory and a processor that executes an operating system including at least one of Android, iOS, and Windows Phone.

15. The method of claim 9 further comprising combining at least one of image data and audio data captured by the docking station and the smartphone into stereo media.

16. A system for enhancing smartphone capabilities, comprising:
    means for detecting connection of a smartphone to a docking station comprising a main body, a battery, a lens, and an imaging sensor; and
    means for responsively sharing electrical power and data between the docking station and the smartphone, wherein the shared data is adapted to cause a display screen of the smartphone to function as a viewfinder for playback display of imagery from the imaging sensor; and wherein the docking station is configured to operate as a handheld camcorder without being connected to the smartphone; and wherein the smartphone further comprises a smartphone camera; and wherein the imaging sensor of the docking station and the smartphone camera are configured to each capture an image from offset positions to form a stereo image.

* * * * *